United States Patent Office 3,486,851

Patented Dec. 30, 1969

3,486,851

FORMATION OF FERROMAGNETIC $CrO_2$ BY DECOMPOSITION OF HIGHER VALENT CHROMIUM OXIDES

William T. Hicks, Windsor Hills, Del., assignor to E. I. du Pont de Nemours and Company, Wilmington, Del., a corporation of Delaware No Drawing. Filed Mar. 1, 1967, Ser. No. 619,559
Int. Cl. C01g 37/02
U.S. Cl. 23—145 8 Claims

ABSTRACT OF THE DISCLOSURE

A chromium oxide composition, in which a chromium oxide having a valence greater than four, is seeded with acicular ferromagnetic chromium dioxide and is then heated between 200° to 400° C. at atmospheric pressure in the presence of oxygen to produce acicular ferromagnetic chromium dioxide useful for the manufacture of magnetic recording members and magnetic cores.

Many patents disclose the synthesis of chromium dioxide, its modification by use of various additives, and its incorporation as a magnetic material for use in recording tapes and devices, etc. In these patents, several methods for preparing the electromagnetic oxide and modified oxide are presented; however, most of these methods require the employment of high pressure equipment suitable for pressures up to about 500 atmospheres while the preferred ranges required for these techniques is in the range of about 200–500 atmospheres. The most commonly employed procedure described in these cases requires the decomposition of chromium trioxide, $CrO_3$, in aqueous media at pressures ranging from 200–300 atmospheres and temperatures ranging from 200–500° C.

Other preparative methods are known wherein chromyl chloride is decomposed on substrates of fibrous inorganic materials or on impure chromium dioxide substrates at atmospheric pressures in an oxygen atmosphere at a temperature ranging from 300–500° C. Another method for producing ferromagnetic chromium dioxide is found in the art where the higher oxides of chromium of the general formula $Cr_xO_y$ (wherein the ratio of $2y$ to $x$ ranges between 4 and 6 and wherein the preferred ratio is from 4.1 to 5.5), are heated in aqueous acid media at pressures ranging between 50 and 3,000 atmospheres at temperatures of 250–500° C.

With the discovery of a ferromagnetic chromium dioxide having suitable magnetic properties and uniform small particle size which makes it useful in certain applications in the manufacture of magnetic recording tapes, magnetic memory recorders, or for computers, gyrator elements and so forth, there arose the need for alternate, less expensive techniques for its manufacture. The oxides of chromium, having ferromagnetic properties, are useful only if they consist of essentially uniform, small particles of tetragonal crystal structure, whose average length is not more than 10 microns with no more than 10% of the particles being longer than 10 microns. These particles contain 58.9%–61.9% and above chromium and exhibit an x-ray diffraction pattern which analysis shows to correspond in its entirety to a tetragonal crystal structure having cell constants of $a_0=4.41\pm0.10$ A and $c_0=2.90\pm0.10$ A. The material made by this invention has a tetragonal crystal structure similar to the rutile $TiO_2$ structure.

Magnetic properties which are particularly important and which render the products of this invention useful in a variety of applications are the intrinsic coercive force ($H_{ci}$), saturation per gram or sigma value ($\Sigma_s$), and the remanence ratio $$\left(\frac{\Sigma_r}{\Sigma_s}\right)$$

that is the ratio of the retentivity or remanence per gram to the saturation per gram. Retentivity and saturation are defined on pages 5 through 8 of Bozorth's Ferromagnetism, D. Van Nostrand Company, New York, 1951. The sigma values given herein are determined in a 4400 gauss field on apparatus similar to that described by T. R. Bardell on pages 226–228 of Magnetic Materials in the Electrical Industry, Philosophical Library, New York, 1955. The definition of the intrinsic coercive force ($H_{ci}$) is given in Special Technical Publication No. A–5 of the American Society for Testing Materials, entitled Symposium on Magnetic Testing, 1948, pages 191–198. The values for intrinsic coercive force given herein are determined in a DC ballistic-type apparatus which is a modified form of the apparatus described by David and Hartenheim in The Review of Scientific Instruments, volume 7, 147 (1936).

For the preparation of high quality recording members, it is preferred that the magnetic material possess a saturation per gram or sigma value $\Sigma_s$, of at least 60 emu per gram. Materials having a saturation per gram above 65, and especially those having a saturation above 75, yield particularly desirable products. It is also desirable that the intrinsic coercive force of the magnetic phase be within certain limits so that resistance to magnetization and demagnetization is sufficiently great so that the recording member is not adversely affected to any great extent by small adventitious fields with which it may come into contact, but at the same time, it is readily adaptable to the signal imposed by recording instrumentation. It is usually desirable that the intrinsic coercive force be in the range of 100–400 oersteds. However, when high resolution is a problem, products having coercive forces above 400 oersteds may be preferable.

It has now been found that good yields of acicular ferromagnetic chromium dioxide can be obtained from decomposing chromium oxide compounds where the chromium has a valence greater than four. The chromium oxide to be decomposed is mixed with ferromagnetic acicular chromium dioxide which acts as a seed for the decomposition of the higher valent chromium oxide. When this mixture is heated at essentially atmospheric pressure (e.g. about 0.5 to 5 atmospheres) to about 200° C. to 400° C. in the presence of oxygen or air, a large yield of acicular ferromagnetic chromium dioxide is obtained in excess of that used as the seeding material.

Modified and unmodified acicular ferromagnetic chromium dioxide made by the processes described in the prior art, e.g., U.S. Patents 2,956,955 or 3,117,093, can be used as seed material for the decomposition of chromium trioxide at atmospheric pressures. The tetragonal crystal structure of the chromium dioxide used as seed in this invention is of the rutile type, i.e., it has the same type of crystal structure as rutile, $TiO_2$. Acicular materials made by these prior art processes usually have an average length of 10 microns and less with no more than 10% of the particles having lengths greater than 10 microns. They have an average axial ratio (a ratio of the particle length to its width) of from 2:1 to 6:1 or more. This elongated shape of the particles makes them particularly well adapted for use in coating compositions to be applied on film or tape for use as recording members. An elongated shape permits the individual particles to be oriented in closer relationship during the magnetic spreading of the composition in thin layers on the substrate. Upon analysis of these preferred chromium dioxide seed materials which usually contain 59.5 to 61.9% or more chromium are also found trace quantities of modifying reagents such as iron, antimony, tellurium and alkali metals, to name a few, since these are often used to prepare the dioxide seed.

If desired, a small percent by weight (about 0.5 to 2.0%) of these modifiers based on the weight of the chromium composition to be decomposed may be mixed in with the seeded mixture to improve acicular orientation and crystallinity.

Chromium dioxide made by previous procedures is formed in an aqueous atmosphere at temperatures ranging between 400–525° C. at pressures of at least 500 atmospheres. It is thereafter washed, dried and milled to reduce the size to thicknesses lower than about 1 micron. While thicker and larger acicular particles can be employed to grow chromium dioxide particles, the above-stated sizes are preferred for preparing material for use in the manufacture of memory devices.

Oxides having a chromium valence greater than 4 can generally decompose at atmospheric pressures in the presence of oxygen at temperatures of 200-400° C. upon the surface of chromium dioxide seed material described above. Materials such as $Cr_3O_8$, $Cr_2O_5$ and $CrO_3$ can also be employed for this process. Also contemplated are mixtures of these oxides. $CrO_3$ is most useful since it is readily available in a quantity and of a purity satisfactory for use in this invention.

The oxides are mixed in weight ratios of seed-to-chromium oxide in proportions of from 10–90% by weight chromium dioxide seed per total weight of the reaction mixture.

The reaction is generally carried out by slowly heating the mix from 100° C. to about 400° C. and thereafter holding for at least 2 hours to obtain the maximum yield. Generally a temperature of about 200° C. to 400° C. for 2 to 5 hours is preferred, however, shorter and longer periods can be used.

The reaction is carried out in an oxygen or air atmosphere to insure that enough oxygen remains in the atmosphere to prevent the decomposition of chromium dioxide to chromium III oxide. This is generally accomplished by displacing the reactor volume at least by one volume of air every 5 minutes. If oxygen is used, a lesser volume is needed than that for air.

It can generally be stated that the smaller the seed's particle size, the greater will be the conversion to a freshly deposited chromium dioxide. The newly converted acicular ferromagnetic chromium dioxide actually grows on the seed. Using seed material of a particle diameter ranging from .01 to .25 micron can give 4 times its weight in useful product.

The process is carried out in corrosion-resistant containers, that is, containers constructed of a material which is inert to the reactants and products under the above-stated conditions. For example, platinum metals, stainless steels, high nickel alloys, etc., can be used as materials of construction for the container.

Although it is practical to carry out the reaction at atmospheric pressure or pressures close to atmospheric, it should be realized that the reaction will go at higher pressures. Normally, the reaction is carried out in the absence of water, however, traces of water vapor appear to be ineffective in altering the yield. The container is placed in a suitable furnace wherein the rate of heat-up can be controlled at approximately 50° C. per hour in the range of 100–400° C. The heat-up usually takes place at the slow rate until the temperature of about 300° C. is reached, which is then held for the duration of the reaction. After the reaction mixture has been heated at the desired temperature for about 0.5 to 5 hours, the entire reaction vessel is cooled. The cool-down time is not critical as long as an oxygen atmosphere is maintained until the product is cooled to about 100° C. The reaction mixture can then be washed to remove soluble chromium components and separated from non-magnetic materials by first subjecting the material to a magnetic field and applying standard magnetic separation techniques.

The resulting materials can have intrinsic coercivities in the range of 100–300 oersteds with the saturation magnetization values in the range of 40–90 emu per gram and remanence values in the range of 15–40 emu per gram.

EXAMPLE 1

Acicular $CrO_2$ was made by a high pressure process such that the majority of particles were approximately one micron long by 0.1 micron diameter. 1.5 grams of this seed $CrO_2$ were mixed with 1.5 grams $CrO_3$ and placed in a platinum boat, then placed in a 31-mm. O.D. Pyrex tube. Oxygen gas at one atmosphere was streamed through the tube while the sample and platinum boat were heated slowly to 275° C. The sample was held at this temperature for 2 hours. After the sample was cooled in the $O_2$ stream to 100° C., the weight loss amounted to 17.7% of the initial $CrO_3$ weight. The sample was washed with water and acetone, and its magnetic properties were measured and compared with those of the original seed. This is summarized in the table below.

| | $H_{ci}$ ($O_e$) | $\Sigma_s$ (emu/gm.) | $\Sigma_r$ (emu/gm.) |
|---|---|---|---|
| Seed | 378 | 83.3 | 38.4 |
| Product | 300 | 84.7 | 35.2 |

The high saturation-magnetization value obtained from the product indicated high purity. Thus for every gram of $CrO_2$ seed 0.84 grams of new $CrO_2$ was obtained from the $CrO_3$. Electron microscope studies showed that the product consisted of particles approximately one micron long with a length-to-diameter ratio of about 6:1 as compared with about 10:1 for the original seed.

EXAMPLE 2

Using apparatus and procedures described in Example 1, 3-gm. samples of $CrO_3$–$CrO_2$ mixture were made by hand mixing techniques and were slowly heated to 300° C. and held there for 1 hour in air. These mixtures contained 1% $Sb_2O_3$ based on the weight of $CrO_3$ portion added to the sample and the $Sb_2O_3$ was thought to act as a modifier. The mixtures and their magnetic properties are listed in Table 1. The high $\Sigma_s$ values obtained indicate that the final product is relatively pure $CrO_2$.

TABLE 1

[Properties obtained with varying seed content. 300° C., 1 hr. $Sb_2O_3$ present at 1% of $CrO_3$ wt.]

| Sample | Wt. percent $CrO_2$ seed | Percent yield (based on seed) | $H_{ci}$ ($O_e$) | $\Sigma_s$ (emu) (gm.) | $\Sigma_r$ (emu) (gm.) |
|---|---|---|---|---|---|
| A | 25 | 255 | 204 | 78.9 | 25.2 |
| B | 33 | 168 | 240 | 84.0 | 30.2 |
| C | 50 | 83 | 303 | 82.9 | 33.5 |

EXAMPLE 3

Using apparatus and procedures of Example 1, 3-gm. samples were prepared by mixing equal weights of $CrO_2$ with $CrO_3$ by mechanically shaking the ingredients in a bottle containing glass beads. The samples were slowly heated to the temperatures indicated and were held at 200° C. for 5 hours or for 1 hour at the other listed temperatures. Conditions, mixtures and magnetic properties are listed in Table 2.

TABLE 2

[Properties obtained with varying temperature at 50% $CrO_2$ seed level]

| Sample | T. (° C.) | $H_{ci}$ ($O_e$) | $\Sigma_s$ (emu) (gm.) | $\Sigma_r$ (emu) (gm.) |
|---|---|---|---|---|
| A | 200 | 277 | 86.5 | 35.6 |
| B | 200 | 282 | 81.3 | 32.6 |
| C | 225 | 282 | 82.5 | 33.8 |
| D | 225 | 277 | 83.7 | 34.6 |
| E | 250 | 266 | 83.6 | 32.2 |
| F | 250 | 273 | 89.4 | 35.2 |
| G | 275 | 277 | 87.4 | 35.0 |
| H | 275 | 282 | 87.2 | 35.0 |

Based on chromium dioxide seed the yield was approximately 170 percent.

The ferromagnetic properties of the chromium dioxide prepared by this invention can be used for magnetic coatings for recording tapes, drums, and records, magnetic memory cores, computers, or cores for microwave attenuators, gyrator elements, electrically operated high frequency switches, low loss transformer cores for high frequency ranges, focusing magnets, magnetic clutches, and thermal-magnetic document copiers.

The embodiments of the invention in which an exclusive property or privilege is claimed are defined as follows:

1. A process for preparing acicular ferromagnetic chromium dioxide which comprises (a) heating at essentially atmospheric pressure in the presence of an atmosphere of oxygen, a mixture of seed acicular ferromagnetic chromium dioxide and a chromium oxide wherein said chromium has a valence greater than four and said seed is present in amount of 10% to 90% of the mixture, the temperature is maintained between about 200° C. to 400° C. for a period of about 0.5–5 hours, (b) cooling the reaction mixture in said oxygen atmosphere until the temperature is less than 100° C., and (c) recovering acicular ferromagnetic chromium dioxide from the reaction mixture.

2. Process as defined in claim 1 wherein said seed chromium dioxide has a particle diameter of 0.01 to 0.25 micron.

3. Process as defined in claim 1 wherein said atmosphere of oxygen consists essentially of a flow of air.

4. Process as defined in claim 1 wherein a minor amount of a ferromagnetic chromium dioxide modifying agent is added to the reaction mixture before heating.

5. Process as defined in claim 1 wherein said chromium oxide is chromium trioxide.

6. A process for preparing acicular ferromagnetic chromium dioxide which comprises (a) mixing seed ferromagnetic acicular chromium dioxide and chromium oxide with chromium valence greater than four, to for a mixture containing about 10 to 90 percent by total weight of chromium dioxide, (b) heating said mixture at essentially atmospheric pressure for about 2 to 5 hours at about 200° C. to 400° C. while continually passing air through the heating chamber, whereby acicular ferromagnetic chromium dioxide is formed from said chromium oxide, (c) cooling the reaction mixture while maintaining said air flow until the temperature is less than 100° C., and (d) recovering acicular ferromagnetic chromium dioxide from said reaction mixture.

7. Process as in claim 6 wherein said seed chromium dioxide has a particle diameter of about 0.01 to 0.25 micron.

8. Process as defined in claim 6 wherein a minor amount of ferromagnetic chromium dioxide modifying agent is added to said reaction mixture before heating.

References Cited

UNITED STATES PATENTS

| | | | |
|---|---|---|---|
| 3,078,147 | 2/1963 | Cox | 23—145 |
| 3,117,093 | 1/1964 | Arthur | 23—145 |

FOREIGN PATENTS

| | | |
|---|---|---|
| 1,407,333 | 6/1965 | France. |

OSCAR R. VERTIZ, Primary Examiner

HOKE S. MILLER, Assistant Examiner

U.S. Cl. X.R.

252—62.51